No. 719,761. PATENTED FEB. 3, 1903.
E. DELMOULY.
APPARATUS FOR PURIFYING WATER FOR STEAM GENERATORS, &c.
APPLICATION FILED APR. 21, 1902.
NO MODEL. 4 SHEETS—SHEET 3.
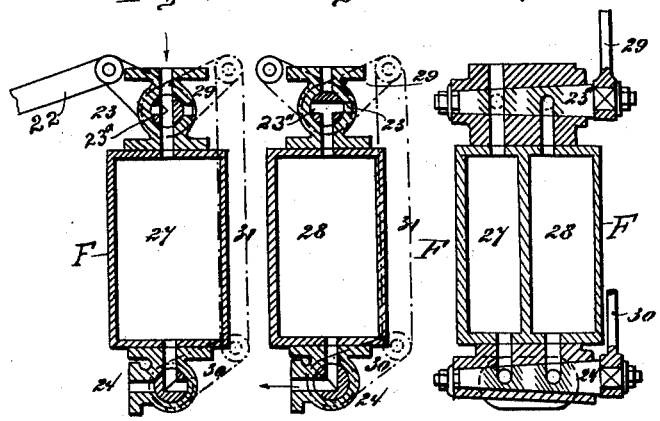
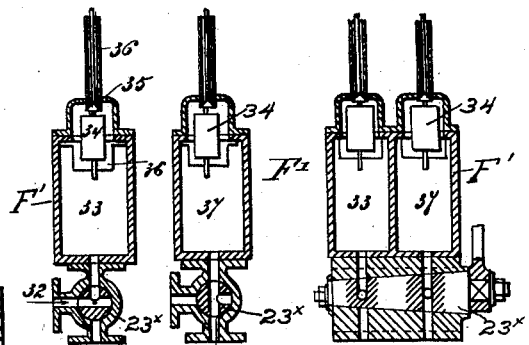
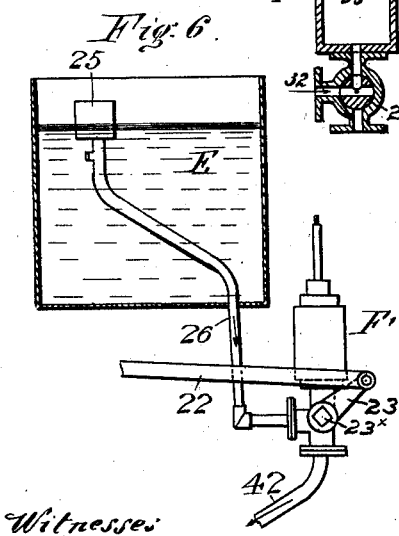
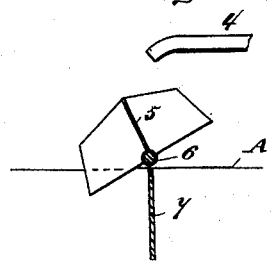
Witnesses:
L. Waldman
E. Hannuch
Inventor:
Eloi Delmouly
per B. Singer,
Attorney

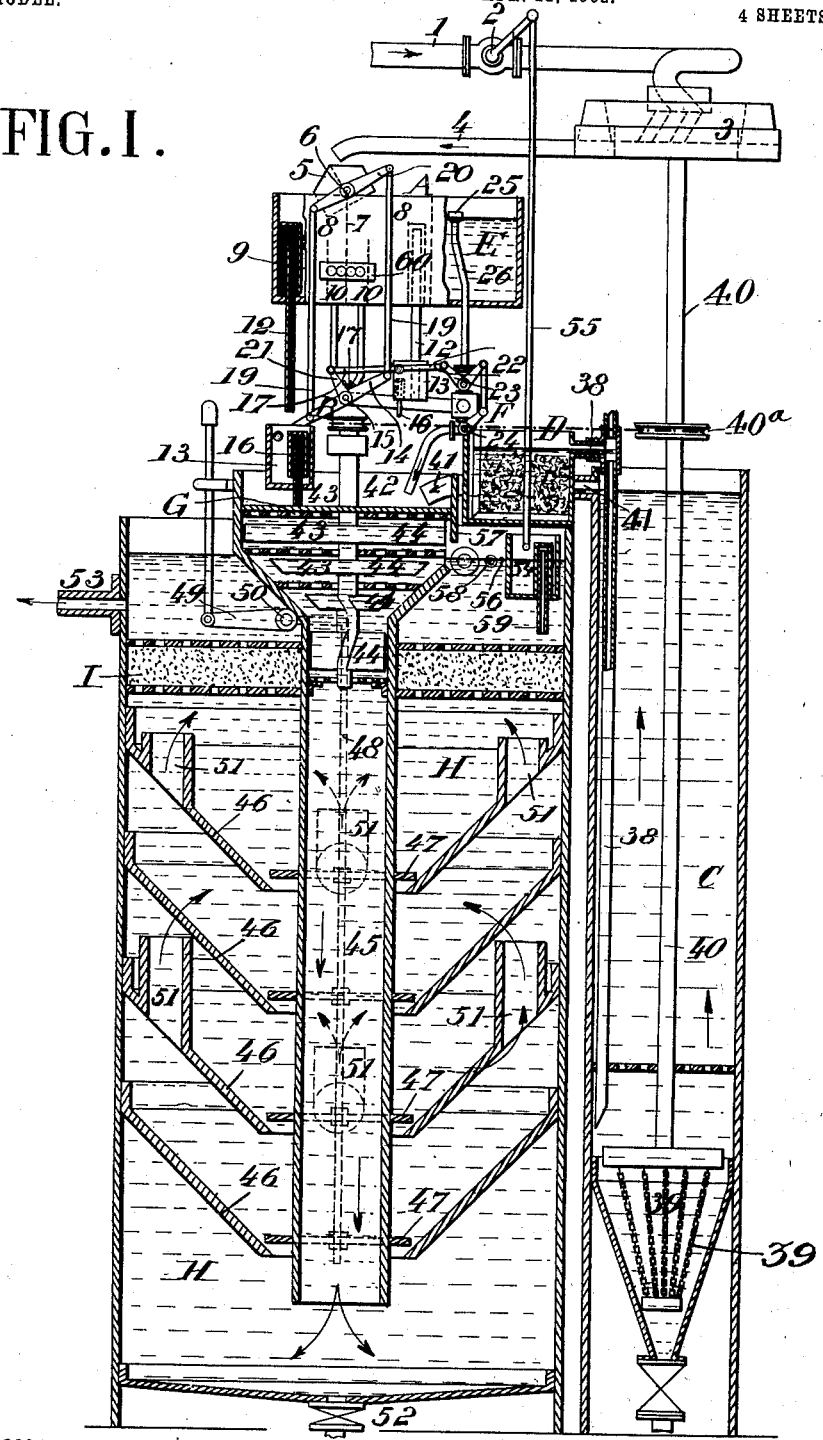
FIG. I.

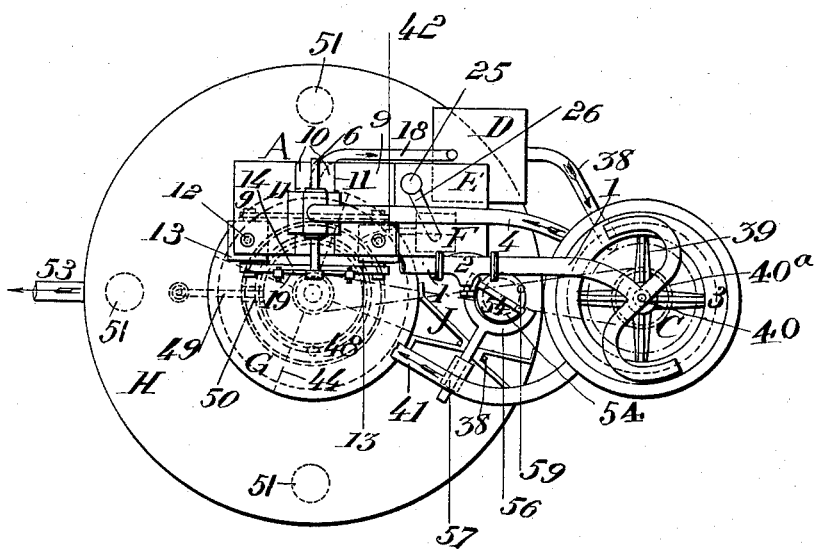

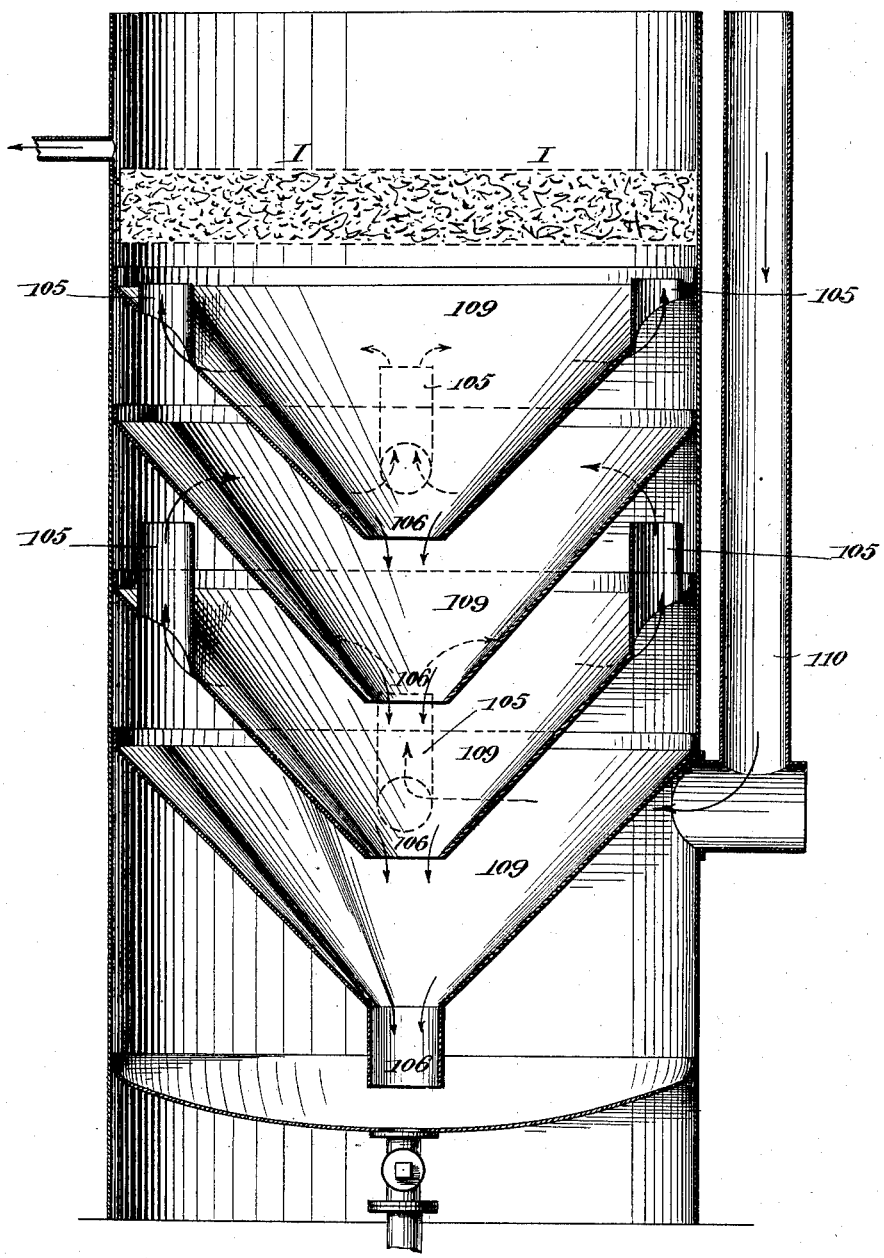

UNITED STATES PATENT OFFICE.

ELOI DELMOULY, OF PARIS, FRANCE.

APPARATUS FOR PURIFYING WATER FOR STEAM-GENERATORS, &c.

SPECIFICATION forming part of Letters Patent No. 719,761, dated February 3, 1903.

Application filed April 21, 1902. Serial No. 103,941. (No model.)

*To all whom it may concern:*

Be it known that I, ELOI DELMOULY, a citizen of the French Republic, and a resident of Paris, France, have invented a certain new and useful Apparatus for Purifying Water for Steam-Generators and for other Purposes, of which the following is a specification.

My invention relates to a new and useful apparatus for purifying water for steam-generators and for other purposes; and its object is to supply the water, delivered in required quantities, with appropriate predetermined quantities of reagents to cause the impurities therein to become precipitated.

I will proceed to describe my invention with reference to the accompanying drawings, in which—

Figure 1 is an elevation, partly in section, of my improved purifying apparatus; Fig. 2, a corresponding plan. Fig. 3 is a detail in vertical central section through one compartment of the soda-distributer, showing the upper tap open for communication with the soda-tank and the lower tap closed. Fig. 4 is a like view through said compartment, showing, however, both taps open, the upper for communication with the air and the lower for emptying the contents into the water to to be purified. Fig. 5 is also a vertical central section through the soda-distributer, but at right angles to the foregoing, to show its two compartments, one arranged to receive and the other to discharge. Fig. 6 is a detail in elevation and partly in section, showing a modification of the soda-distributer and its connection with the soda-tank. Fig. 7 is an enlarged detail, in vertical central section, through one compartment of said modification, showing its feed-tap open to receive from the soda-tank and its air-inlet closed. Fig. 8 is a like section through said compartment, showing discharge-tap open, as also the air-inlet; and Fig. 9 is a vertical central section at right angles to the foregoing, showing both compartments, one arranged to receive and the other to discharge. Fig. 10 is a detail of the water-distributer, and Fig. 11 is a vertical central section through a modification of the settling-tank.

The apparatus comprises, essentially, a measuring-tank A for the water to be purified; a hydraulic balance B; a saturater C, with tank D, containing lime; a tank E, containing soda distributed by a delivery device; a reaction vessel G, fitted with an agitator; a settling-tank H, furnished with removable overflow-baffles, and a filter I. These various parts, hereinafter fully described, are so combined and arranged as to contribute toward a mutual purpose and to form a complete apparatus.

The water to be purified is delivered through a tube 1, fitted with a tap 2, and flows onto a turbine 3, which it actuates, and then escapes by a tube 4. The water from the tube 4 is delivered into a distributer fitted with a partition 5, which is adapted to turn about an axis 6, Figs. 1 and 10. Moreover, the partition is furnished with side plates or cheeks to guide the water in the descent and prevent it flowing off sidewise. Beneath the distributer is the measuring-tank A, divided into two equal compartments 8 8 by a vertical partition 7, passing through the axis 6 and which extends above the water-level in the compartments 8 8. Both of these compartments are divided into two unequal parts 9 and 10 by the partitions 11. The compartments 10 10 receive alternately and directly the water coming from the distributer 5 and flowing into the one or the other according to the position thereof. When the compartments 10 10 are full, the water overflows the partitions 11 11 and then enters the compartments 9 9, which it fills to a level determined by the action of the siphons 12 12. Each of these siphons comprises two concentric tubes. One of smaller diameter is fixed to the bottom of the tank A, through which it projects downwardly, while the larger or outer tube is closed at its upper end and reaches down to a certain distance from the bottom of the tank. The water fills the compartment 9, rises between the siphon-tubes, and finally escapes through the inner tube, thus automatically starting the siphon action, thereby emptying the compartment 9, the liquid flowing into one or other of the vessels 13 13, placed for this purpose beneath the tank A at the two extremities of a beam 14, mounted on a shaft 15. Each of the vessels 13 is furnished with a siphon 16 similar to the one, 12, previously described, and the shaft 15 controls a tap 17, with several passages, which forms the communication between the compartments 10 and the lime-tank, with which it is connected by a tube 18. Whenever either of the compartments 9 runs empty into the vessel 13, the weight of the latter is increased and causes it to descend by oscillating the beam 14 and turning the shaft 15. The beam 14 is connected by two rods 19 to another beam 20, fast on the distributer on the shaft 6, and by its motion operates the beam 20 and the distributer 5, and thus prevents the water from flowing into compartment 9, which is being emptied, and instead conducts the water into the next compartment 9, which begins to fill. As soon as the vessel 13 is full its siphon 16 comes into operation and empties itself into the reaction vessel G; but then the compartment 9, which has just been filled, overflows in its turn into the second vessel 13 and the beam 14 starts rocking again, but in the opposite direction, in such a manner that the distributer 5 delivers the water coming from tube 4 into the compartment 10 adjacent to the compartment 9, which has just been emptied, whence it overflows into said latter compartment, and the same cycle of operations is repeated successively during the working of the apparatus. The amplitude of the oscillation of the beam 14 may be limited by two stops arranged in suitable positions. The shaft 15, which controls the tap 17, has a rocking motion which causes the liquid contained in both compartments 10 to flow alternately through the tube 18.

The respective capacities of the compartments 9 and 10 of the measuring-tank A are determined according to the data derived from the analysis of the water to be purified, and the volumes of the compartments 10 correspond to the volume of the water necessary to dissolve the quantity of lime destined for the precipitation of the carbonates.

Upon the shaft 15 is keyed a crank 21, joined by the connecting-rod 22 to a lever 23, fixed to the plug of a three-way tap 23$^a$, fitted on the distributer F, which latter is provided at its lower end with another tap 24 and communicates with the soda-tank E by a device consisting of a float 25 and a flexible tube 26, provided with an orifice near its upper end. The distributer F is divided into two compartments 27 and 28, and the lower and upper taps are connected with each other by levers 29 and 30 and a connecting-rod 31, as is shown in Fig. 5. These taps are so arranged that when compartment 27, Fig. 3, is in communication with the soda-tank E and is being filled with the reagents the compartment 28 is open at top and in communication with the emptying-tube at its bottom end, and vice versa—in other words, one compartment is being filled while the other is emptied. The solution of soda runs out of the distributer by the tube 42 and mixes with the water to be purified in reaction vessel G. Thus at each movement of the hydraulic balance, and consequently for each emptying of one of the compartments 9 of the tank, a constant volume of solution of soda passes into the distributer, which solution has previously been prepared according to the requirements determined by analysis and of which the required volume is supplied to the water being purified to act as a reagent and precipitate all the sulfates and chlorids.

The arrangement of the distributer of soda shown in Figs. 3, 4, and 5 may be replaced by that shown in Figs. 6, 7, 8, and 9. The supply of the reagent is effected in the same manner as in the previously-described arrangement—that is to say, by means of a float and a flexible tube. A tap 23$^\times$, with two delivery-orifices and three ways, is placed in the lower portion of the distributer F', which, as before, is divided into two independent compartments 33 and 37, it being controlled by a crank and a connecting-rod receiving motion from the shaft 15. This tap receives through the orifice 32 the reagent from tank E. In the position shown in Fig. 7 the liquid enters the compartment 33 and raises the float 34, formed in one with the valve 35 and maintained in position by the guides 36 36. During its ascending motion the reagent drives out the air contained in the compartment 33 until valve 35, pushed by the float, closes the outlet for the air. The compartment 33 is thus completely filled, while at the same time the compartment 37, Fig. 8, is emptied, as will be clearly understood by examining the drawings.

It has been previously stated that the compartments 10 10 of the measuring-tank A are emptied alternately through the tap 17 and tube 18 into the lime-tank D, which is furnished with a false perforated bottom carrying an appropriate quantity of lime. The water from these compartments runs in at the lower portion of the tank beneath the false bottom, then up through the quantity of lime, which it partly dissolves and forms lime-water, which runs off through the tube 38, and so into the lower part of the saturater C, the lower end of which terminates in a tapered portion, as shown.

The turbine 3, operated by the water before it enters the measuring-tank A, actuates an agitator 39, formed by a series of chains supported by rings or cross-bars, as shown in Fig. 1, and conforming to the tapered bottom of the saturater. These rings or cross-bars are mounted on shaft 40 of the turbine, which imparts to them a rotary motion, as also the chains supported thereby. The agitation of the lime in the tapered bottom of the saturater produces the saturation of the water, which rises to the upper part of the saturater, where it arrives completely clarified and overflows into the vessel G through a tube 41. Thus this vessel receives, first, the discharge of the water to be purified from the siphons 16; second, the soda solution from the tube 42; third, the water saturated with lime from tube 41. Therefore it is in this part of the apparatus that the different reactions will take place. To facilitate and complete these reactions, a stirrer made of wire-gauze or perforated sheet-plates 43 and an agitator, with helicoidal blades 44 44, mixes the water to be purified with the reagents. This agitator is operated by the shaft 40 of the turbine 3, as is shown in Fig. 1—to wit, by means of a chain belt connecting chain-wheel 40ª on said shaft with another chain-wheel on the agitator-shaft. The mixture of the water to be purified and the reagents enter through the tube 45 into the lower part of the settling-tank H, in which the precipitations of the calcareous salts and of magnesium and others take place. The water rises to the upper portion of the settling-tank, passing through a series of truncated cones destined to stop and to receive the sediments. These truncated cones 46 rest and are adjusted with their largest periphery upon the inner walls of the settling-tank. They leave at the center and round the tube 45 annular spaces closed by the plates 47, connected together by two rods 48, arranged diametrically opposite each other and controlled by a forked lever 49, oscillating about a fixed shaft 50. This lever is operated from the exterior of the apparatus, as will be seen from Fig. 2. The truncated cones 46 are fitted near their upper ends with pipes 51, placed in regular order and causing the water to flow through a circuitous path before reaching the filter I. During the circulation the precipitation becomes deposited on the inside of the truncated cones and accumulates on the plates 47. The sediments can be removed periodically by lifting the plates 47 by operating the lever 49, whereby they are caused to fall to the bottom of the settling-tank. Then by opening the tap 52 they can be withdrawn from the apparatus. The purified water on leaving the filter flows off through a tube 53.

In order to insure the regular function of the apparatus, the water-supply tap 2 is connected with a float 54 by a rod 55. The float 54 is open at its upper end and is supported by a lever 56, furnished with a counterweight 57, Fig. 1, and oscillating on a shaft 58. It is furnished internally with a siphon 59, similar to the siphon 12 previously described, in which the upper part of the central tube is below the upper edge of the float 54. In a normal position this float 54 is raised by the counterweight 57, and thus opens the tap 2 to its fullest extent. So soon as the level of the liquid rises in the settling-tank H to the upper edge of the central tube of the siphon, whether it be caused by a stoppage, by a slower consumption of purified water, or in any other manner, the siphon will cause the water to flow into the float 54, and thus starts the siphon action. The weight of the water introduced into the siphon interrupts the equilibrium maintained by the counterweight and effects the immediate lowering of the float 54, which shuts off the water-supply. When the level of the water becomes lowered in tank H, the level in the float also falls on account of the siphon 59, which remained in action, and when the level of the water is sufficiently lowered the counterweight 57 raises the float and opens the tap 2 to its full extent. At the same time the siphon finishes emptying the float, which returns to its normal position.

To complete the apparatus, a counter 60 is provided and operated by any one of the moving parts, so as to register the discharge of the water.

In case the nature of the water would necessitate other reagents than the carbonate of soda to be employed—as, for example, perchlorid of iron or aluminium, &c.—then as many identical distributers F and F² should be fitted to the apparatus as there are reagents required.

Having now fully described my invention, what I claim, and desire to secure by Letters Patent, is—

1. In an apparatus for purifying water for steam-generators and for other purposes, the combination with a conduit for supplying the water to be purified, of a motor actuated by the water to be purified; a measuring-tank divided into two compartments, each of which is subdivided into two other compartments by conveniently-disposed partitions, the larger compartments being furnished with siphons adapted to start when the water has reached a certain level and a lime-tank placed in communication with the smallest compartment by the aid of a tap with several passages.

2. In an apparatus for purifying water for steam-generators and for other purposes the combination with a conduit for supplying the water to be purified, and a turbine, hydraulic wheel, or motor actuated by the water to be purified, of a measuring-tank divided into two compartments both of which are subdivided into two other compartments by suitably-arranged partitions, the larger compartments being furnished with siphons started when the water reaches a certain level, of a lime-tank in communication with the smallest compartments by the aid of a tap with several passages, a hydraulic balance consisting of a beam supporting at each end a vessel furnished with a siphon receiving alternatively the water which overflows from the siphons of the measuring-tank, a further beam connected to the former and whose shaft carries a distributing-partition, the action of which conducts the water to be purified alternately into one or other of the compartments of the measuring-tank; a tap with several ways controlled by the first beam and adapted to empty alternately both compartments of the measuring-tank into a saturater, and with or without an intermediate lime-tank.

3. In an apparatus for purifying water for steam-generators and for other purposes, the combination with a conduit for supplying the water, a measuring-tank and a hydraulic balance; of a reagent-distributer consisting of a vessel divided into two independent compartments and furnished with several-way taps, a reaction-tank with which said distributer communicates, and a hydraulic balance actuating the taps in such manner that one of the compartments of the distributer is emptied into the reaction-tank while the other is being filled, and vice versa.

4. In an apparatus for purifying water for steam-generators and other purposes, the combination with a conduit for supplying the water, a turbine in said conduit, a measuring-tank, a reaction-tank, and a hydraulic balance, of a reagent-distributer consisting of a vessel divided into two independent compartments, taps with several ways leading into and from said compartments and operated by the hydraulic balance in such manner that one of the compartments of the distributer is emptied into the reaction-tank while the other is being filled, and vice versa, a saturater having a tapered lower end, an agitator placed in said lower end and formed of chains, a shaft connected with the turbine at its upper end and having a supporting device at its foot from which said chains are hung, a lime-tank communicating with said saturater and into which the water contained in the small compartments of the measuring-tank overflows, a stirrer in the reaction-tank which receives the water to be purified and the dissolved reagents and water saturated with lime, and a shaft for operating said stirrer.

5. In an apparatus for purifying water for steam-generators and for other purposes, the combination with the measuring-tank, a hydraulic balance, a reagent-distributer and a saturater, of a vessel which receives the water to be purified, the dissolved reagents and the water saturated with lime, an agitator placed in said vessel, a settling-tank consisting of a cylindrical vessel, inverted truncated cones, open at base and apex and provided with overflow-tubes, placed therein one above another, a regulator to register the amount of water to be purified, comprising a hollow float open at its upper end, and placed at the upper portion of the settling-tank, a counterweight to keep said float in equilibrium, a siphon connecting the float with a source of liquid-supply; and a connection between said float and the tap through which the water arrives, whereby as soon as the level rises in the tank, the siphon allows the liquid to enter the float which sinks and shuts off the water-supply.

6. In an apparatus for purifying water for steam-generators and for other purposes, the combination with a conduit supplying the water to be purified, a measuring-tank and a distributer; of a settling-tank furnished with movable ring-plates adapted to be operated from the exterior by lever mechanism, substantially as hereinbefore described and shown.

In testimony whereof I have hereunto set my hand in presence of two witnesses.

ELOI DELMOULY.

Witnesses:
ADOLPHE STURM,
EDWARD P. MACLEAN.